Sept. 16, 1952     H. G. CAROLAND     2,610,427
FISHING ROD
Filed July 21, 1949
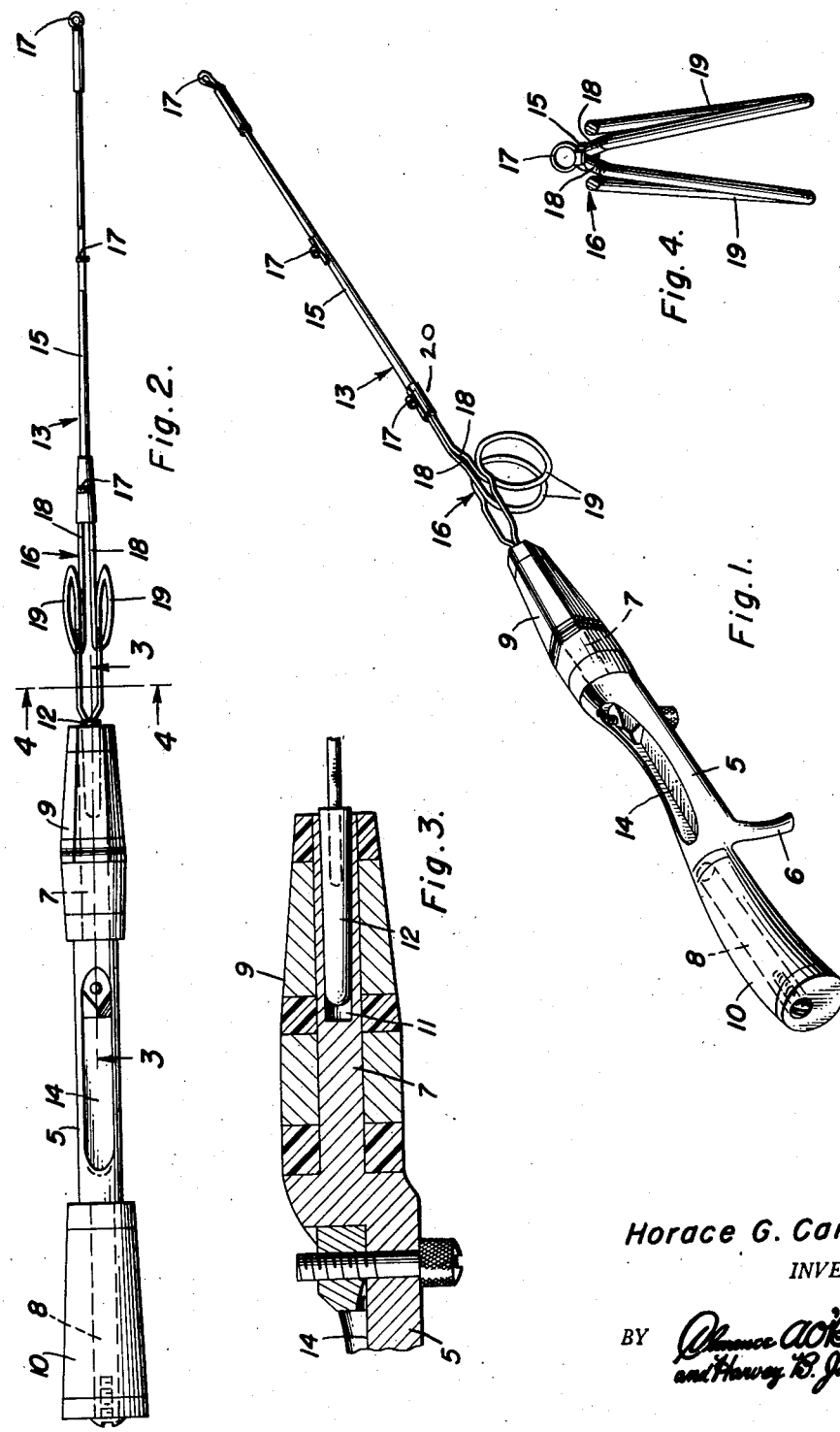
Horace G. Caroland
INVENTOR.

Patented Sept. 16, 1952

2,610,427

UNITED STATES PATENT OFFICE 2,610,427

FISHING ROD

Horace G. Caroland, Hobart, Okla.

Application July 21, 1949, Serial No. 106,073

1 Claim. (Cl. 43—18)

This invention relates to fishing rods, and the primary object of the invention is to provide such a rod whose shaft has a coil spring device interposed therein near its inner end to give greater strength and flexibility and to enable use of a shorter shaft, as compared to a conventional fishing rod.

A further object is to provide the rod with an efficient spring device comprising a pair of similar spring members disposed in side by side relation and having contacting opposite end portions which are secured together, the intermediate portions of said spring members being spaced or spread apart and including longitudinally disposed depending coils.

Other objects and features of the invention will become apparent from the following description when considered with the accompanying drawing, in which:

Figure 1 is a perspective view of a casting rod embodying the present invention;

Figure 2 is a top plan view thereof;

Figure 3 is an enlarged fragmentary longitudinal section taken on the line 3—3 of Figure 2; and, Figure 4 is an enlarged transverse section taken on the line 4—4 of Figure 2.

Referring in detail to the drawings, 5 indicates a reel seat member provided with a finger piece 6 and having tangs 7 and 8 at opposite ends on which handles 9 and 10 are mounted. The front tang 7 has an axial socket 11 in its front end in which is removably frictionally fitted the shank 12 of a shaft 13. The seat member 5 has a recess 14 adapted to have the base of a reel secured therein.

The shaft 13 also includes an elongated flexible front section 15 consisting of a normally straight tapered spring rod, and a coil spring device 16 is interposed between the shank 12 and the section 15 for permitting downward movement of the latter relative to shank 12 when a pull is exerted on the fishing line, and for raising or returning said section 15 to its normal position in alinement with the shank 12 when the pull on the line is released. Of course, the pull on the line will also flex the shaft section 15. The usual fishing line guides 17 are mounted on the shaft section 15.

As shown, the coil spring device preferably consists of a pair of similar spring members or wires 18 disposed in side by side relation and having contacting opposite end portions which are secured together and suitably rigidly connected to the front end of shank 12 and to a coupling 20 adapted to receive the rear end of section 15, the intermediate portions of said spring members being spaced or spread apart and including spaced longitudinally disposed depending coils 19. By using the device 16, a relatively short shaft may be employed which is relatively stiff and strong, and when the shaft is detached from the reel seat and handle member, the rod may be readily carried or stored. As the rod is shorter than usual, it is also easier to use for casting, is lighter in weight, and requires less material in its manufacture. While the spring device is shown in connection with a casting rod having a metal shaft, it may also be used with other types of rods, such as rods having wooden shafts.

The nature and advantages of the invention will thus be apparent to those skilled in the art, and modifications and structural changes are contemplated within the spirit of the invention as claimed.

Having described the invention, what is claimed as new is:

A fishing rod handle having one end thereof provided with a recess to support a rod, a rod comprising two coils, each coil lying substantially in a single plane, the planes being divergent to each other, the outer end of each coil extending in one direction and spaced from each other adjacent the coils and in contact with each other remote from the coils, a coupling joining the remote portions of the coils and having a tight fit within the recess of the handle, the inner portions of the coils being spaced from each other adjacent the coils and extending in a direction opposite from the direction of the outer portions and contacting each other at a location in advance of the coils, a coupling gripping said advanced portions and a rod section mounted in said latter coupling.

HORACE G. CAROLAND.

REFERENCES CITED

The following references are of record in the file of this patent:

UNITED STATES PATENTS

| Number | Name | Date |
|---|---|---|
| 2,306,638 | Meisler | Dec. 29, 1942 |
| 2,351,734 | Backe | June 20, 1944 |
| 2,538,306 | Fox | Jan. 16, 1951 |

OTHER REFERENCES

Popular Science of June 1948, page 208.